United States Patent
Omori et al.

(10) Patent No.: US 12,136,011 B2
(45) Date of Patent: Nov. 5, 2024

(54) CONTAINER INCLUDING RFID MODULE

(71) Applicant: Murata Manufacturing Co., Ltd., Nagaokakyo (JP)

(72) Inventors: Ryohei Omori, Nagaokakyo (JP); Noboru Kato, Nagaokakyo (JP); Hirokazu Yazaki, Nagaokakyo (JP); Mikiko Saito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 84 days.

(21) Appl. No.: 18/193,774

(22) Filed: Mar. 31, 2023

(65) Prior Publication Data

US 2023/0259736 A1     Aug. 17, 2023

Related U.S. Application Data

(63) Continuation of application No. PCT/JP2021/036638, filed on Oct. 4, 2021.

(30) Foreign Application Priority Data

Oct. 5, 2020 (JP) .................................. 2020-168560
Jan. 29, 2021 (JP) .................................. 2021-013692
Jun. 25, 2021 (JP) .................................. 2021-105803

(51) Int. Cl.
*G06K 19/077* (2006.01)
*G06K 19/07* (2006.01)

(52) U.S. Cl.
CPC ... *G06K 19/07798* (2013.01); *G06K 19/0708* (2013.01); *G06K 19/07758* (2013.01); *G06K 19/07771* (2013.01)

(58) Field of Classification Search
CPC ......... G06K 19/07798; G06K 19/0708; G06K 19/07758; G06K 19/07771; G06K 19/077;

(Continued)

(56) References Cited

U.S. PATENT DOCUMENTS 6,259,369 B1    7/2001  Monico
6,456,228 B1    9/2002  Granhed et al.
(Continued)

FOREIGN PATENT DOCUMENTS

JP    2000244362 A    9/2000
JP    2003510728 A    3/2003
(Continued)

OTHER PUBLICATIONS

International Search Report in PCT/JP2021/036638, mailed Dec. 14, 2021, 4 pages.

(Continued)

*Primary Examiner* — Omeed Alizada
(74) *Attorney, Agent, or Firm* — ArentFox Schiff LLP

(57) ABSTRACT

A container including an RFID module is provided that includes a base, a metal film, and a slit. The base has an insulating property. The metal film is on a first main surface of the base. The slit separates the metal film into a first metal region and a second metal region. The RFID module includes an RFIC element, a filter circuit configured to transmit a current due to an electromagnetic wave at a natural resonance frequency being a communication frequency to the RFIC element, and first and second electrodes to be connected to the filter circuit. The first electrode of the RFID module and the first metal region of the metal film are electrically connected to each other. The second electrode of the RFID module and the second metal region of the metal film are electrically connected to each other.

17 Claims, 14 Drawing Sheets

(58) Field of Classification Search
CPC .... G06K 19/07749; B65D 5/42; B65D 25/20; H01Q 1/38; H01Q 1/44; H01Q 1/50; H01Q 5/335; H01Q 9/16; H01Q 9/28; H01Q 19/02
See application file for complete search history.

(56) References Cited

U.S. PATENT DOCUMENTS

| | | | |
|---|---|---|---|
| 2009/0027210 A1* | 1/2009 | Sakama | G06K 19/07756 340/572.7 |
| 2015/0087362 A1 | 3/2015 | Dokai et al. | |
| 2015/0357716 A1 | 12/2015 | Chen et al. | |
| 2019/0307028 A1* | 10/2019 | Yazaki | H01Q 1/243 |
| 2019/0386376 A1* | 12/2019 | Kato | G06K 19/077 |

FOREIGN PATENT DOCUMENTS

| | | |
|---|---|---|
| JP | 2005149298 A | 6/2005 |
| JP | 2009031893 A | 2/2009 |
| JP | 2015231240 A | 12/2015 |
| JP | 2020162104 A | 10/2020 |
| WO | 2014054747 A1 | 4/2014 |
| WO | 2018164255 A1 | 9/2018 |
| WO | 2019039484 A1 | 2/2019 |
| WO | 2019049592 A1 | 3/2019 |

OTHER PUBLICATIONS

Yamaguchi, Isao, "Challenges for practical use and possibility of introduction as seen in the demonstration experiment of RFID application in home appliance—UHF band tag that gathers expectations with generally good experimental results," Material Flow, Jun. 2004, vol. 45, No. 6, pp. 50-61.

\* cited by examiner

CONTAINER INCLUDING RFID MODULE

CROSS REFERENCE TO RELATED APPLICATIONS

This application is a continuation of PCT Application No. PCT/JP2021/036638, filed Oct. 4, 2021, which claims priority to Japanese Patent Application No. 2020-168560, filed Oct. 5, 2020, Japanese Patent Application No. 2021-013692, filed Jan. 29, 2021, and Japanese Patent Application No. 2021-105803, filed Jun. 25, 2021, the entire contents of each of which are hereby incorporated by reference in their entirety.

TECHNICAL FIELD

The present invention relates to a container including an RFID module, and, more particularly, to a container including an RFID module using a radio frequency identification (RFID) technology that performs data communication in a non-contact manner by an induction field or a radio wave.

BACKGROUND

Conventionally, it has been considered to manage products in a container by attaching an RFID tag to the container that functions as a wireless communication device. In the RFID tag, a metal material, such as an antenna pattern, is formed on an insulating substrate, such as a paper material or a resin material, together with a radio-frequency integrated circuit (RFIC). However, when a metal film is formed on the outer surface of the container, the RFID tag is affected and communication cannot be performed.

In the RFID tagged container as described above, WO2019/039484 (hereinafter "Patent Document 1") describes a configuration in which an RFID tag capable of corresponding to metal formed in a part of the container is provided so as not to impair designability.

The RFID tag disclosed in Patent Literature 1 includes an RFIC chip and an antenna pattern, and a metal film cannot be formed on the container in these regions. Therefore, a container including an RFID module in which a reduction in the degree of freedom of designability is further suppressed is required.

SUMMARY OF THE INVENTION

Accordingly, it is an object of the present invention to provide a container including an RFID module in which a reduction in designability is suppressed in a container on which a metal film is formed.

In an exemplary aspect, a container is provided that includes an RFID module and that further includes a base material having an insulating property; a metal film on a first main surface of the base material; and a slit that separates the metal film into a first metal region and a second metal region. The RFID module includes an RFIC element, a filter circuit configured to transmit a current due to an electromagnetic wave at a natural resonance frequency being a communication frequency to the RFIC element, and first and second electrodes to be connected to the filter circuit. The first electrode of the RFID module and the first metal region of the metal film are electrically connected to each other, and the second electrode of the RFID module and the second metal region of the metal film are electrically connected to each other.

According to the exemplary aspects of the present invention, a container including an RFID module is provided that suppresses a reduction in designability in a container on which a metal film is formed can be provided.

DETAILED DESCRIPTION

Figure 1:
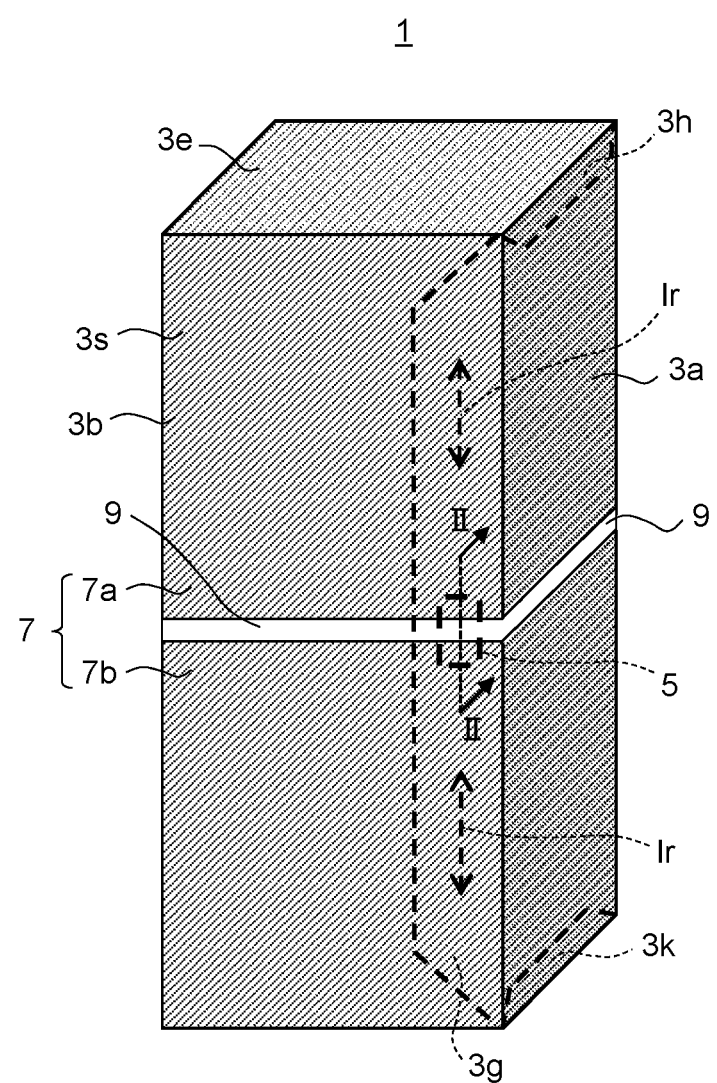
FIG. 1 is a perspective view of a container including an RFID module of a first exemplary embodiment.

A container of one exemplary aspect according to the present invention is a container that includes an RFID module. In this aspect, the container includes an insulating base material, a metal film on a first main surface of the base material, and a slit that separates the metal film into a first metal region and a second metal region. The RFID module includes: an RFIC element, a filter circuit configured to transmit a current due to an electromagnetic wave at a natural resonance frequency being a communication frequency to the RFIC element, and first and second electrodes to be connected to the filter circuit. The first electrode of the RFID module and the first metal region of the metal film are electrically connected to each other, and the second electrode of the RFID module and the second metal region of the metal film are electrically connected to each other.

In the container of the exemplary aspect, since the first metal region and the second metal region of the metal film formed on the first main surface of the base material of the container are used as an antenna, in the container in which the metal film is formed, the RFID module can be attached to the container while suppressing reduction in the degree of freedom of designability.

In addition, when the metal film is irradiated with the electromagnetic wave at the communication frequency, a current may flow in a direction intersecting the slit. As described above, since the metal film functions as a dipole antenna, communication characteristics as a dipole antenna can be obtained.

In an exemplary aspect, the length in the direction orthogonal to the slit of the metal film may have an electrical length of ½ wavelength of the electromagnetic wave at the communication frequency. In this case, the maximum communication distance as a dipole antenna can be obtained.

Moreover, in an exemplary aspect, the slit extends around the side surfaces of the container. Accordingly, even when a plurality of containers are arranged in the same direction, the slits are in contact with each other, and the first metal region and the second metal region of the metal film of each container do not conduct without going through the RFID module. According to this configuration, it is possible to communicate with the plurality of containers at a time.

Moreover, the first metal region and the second metal region may be line-symmetric with respect to the slit. Accordingly, even when a plurality of containers are arranged with the containers turned upside down with respect to the slits, the slits are in contact with each other, and the first metal region and the second metal region of the metal film of each container do not conduct without going through the RFID module. Therefore, the operator can reduce attention to the direction of the container 1.

In an exemplary aspect, the base material includes a flap continuous with the first surface for connecting by an adhesive layer the first surface and the second surface on each of which a metal film is formed, the metal film may also be formed on the flap, the slit may also be formed on the flap, and the RFID module may be disposed on the flap. Accordingly, in the container, the RFID module arranged on the flap continuous with the first surface is attached to the inner surface of the second surface, and thus does not appear on the outer surface of the container. Therefore, the designability of the container can be flexible and not reduced.

Moreover, in an exemplary aspect, one end of the slit may extend to the end portion of the flap.

A first dividing slit configured to form the first metal region of the flap and a metal region discontinuous with the first metal region of the first surface in a region on one side of the flap where a metal film of the flap is divided by the slit, and a second dividing slit configured to form the second metal region of the flap and a metal region discontinuous with the second metal region of the first surface in a region on another side of the flap where a metal film of the flap is divided by the slit may be provided according to an exemplary aspect. Accordingly, since the ratio of the first metal region and the second metal region with respect to the flap can be reduced, the variation in the communication characteristics due to the variation in the bonding distance between the flap and the second surface can be reduced.

In addition, the RFID module can be disposed on a second main surface opposite to the first main surface of the base material. Accordingly, since the RFID module does not appear on the outer surface of the container, the designability of the container can be flexible and not reduced.

In an exemplary aspect, the metal film may be formed on the entire surface of the first main surface of the base material except for the slit. A design in which a metal film is formed on the entire surface of the first main surface of the container can also be achieved.

The flap may include a non-metallic region where the metal film is not formed on the first main surface of the flap, and the non-metallic region of the flap and a second main surface of the second surface may be bonded to each other through the adhesive layer.

The filter circuit may be an LC parallel resonance circuit. Accordingly, a current at a frequency matching the RFIC can be flowed through the RFIC.

The sheet resistance of the metal film may be 0.5Ω/☐ or more. Even with this configuration, since the RFID module includes the filter circuit, it can be flowed through the RFIC using the eddy current generated in the metal film.

In an exemplary aspect, the thickness of the metal film may be 1 nm or more and 1 μm or less. Even with this configuration, since the RFID module includes the filter circuit, it can be flowed through the RFIC using the eddy current generated in the metal film.

It should be noted that each of the embodiments described below shows a specific example of the present invention, and the present invention is not limited to this configuration. In addition, numerical values, shapes, configurations, steps, order of steps, and the like specifically shown in the following embodiments show examples, and do not limit the present invention. In addition, in all the embodiments, the configurations in the respective modifications are the same, and the configurations described in the respective modifications may be combined.

When the relative dielectric constant εr>1, the electrical lengths of the antenna pattern and the conductor pattern become longer than the physical length. In the present specification, the electrical length is a length in consideration of shortening or extension of a wavelength due to a relative dielectric constant or a parasitic reactance component.

First Exemplary Embodiment

Figure 2:
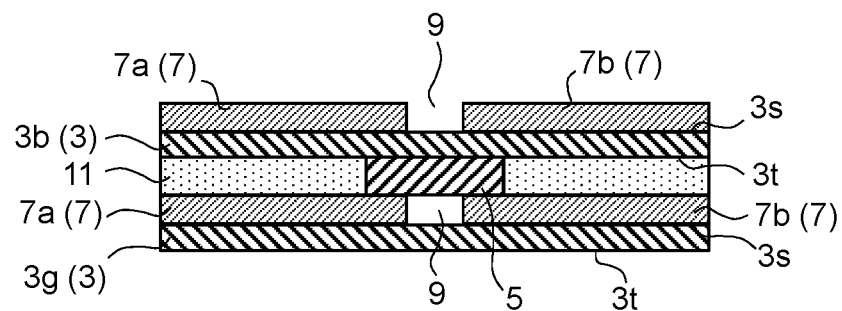
FIG. 2 is a cross-sectional view taken along line indicated by arrows II-II in FIG. 1.

Next, a schematic configuration of a container 1 including an RFID module 5 according to the present invention will be described. FIG. 1 is an overall perspective view of a container 1 including an RFID module 5 according to a first exemplary embodiment. FIG. 2 is a cross-sectional view taken along line II-II in FIG. 1, and FIG. 3 is a developed view of the container 1 in FIG. 1.

As shown, the container 1 of the first exemplary embodiment includes a base material 3, an RFID module 5 attached to the base material 3, a metal film 7 formed on a first main surface 3s of the base material 3, and a slit 9 formed to divide the metal film 7.

Figure 3:
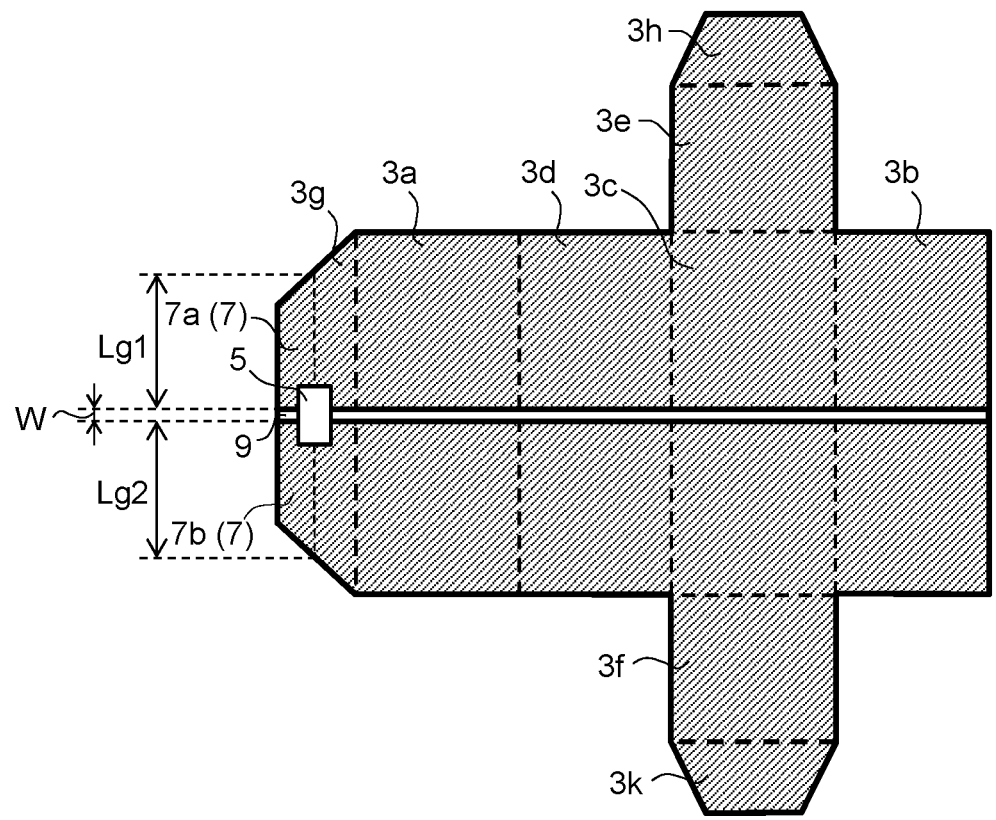
FIG. 3 is a developed view of the container in FIG. 1.

The container 1 is formed into a three-dimensional shape by assembling a planar base material 3 as shown in FIG. 3, for example. The container 1 has, for example, a rectangular parallelepiped shape, and the base material 3 is made of, for example, paper, resin, or plastic according to an exemplary aspect.

The base material 3 (also referred to as a "base") includes a first surface 3a, a second surface 3b, a third surface 3c, a fourth surface 3d, a fifth surface 3e, a sixth surface 3f, a first flap 3g, a second flap 3h, and a third flap 3k. For example, the first surface 3a to the fourth surface 3d are side surfaces when assembled, the fifth surface 3e is an upper surface when assembled, and the sixth surface 3f is a lower surface when assembled. Moreover, the first main surface 3s of the base material 3 is a surface to be an outer surface (e.g., front surface) of the container 1, and the second main surface 3t of the base material 3 is a surface to be an inner surface (e.g., back surface) of the container 1.

The first main surface 3s of the first flap 3g is attached to the second main surface 3t of the second surface 3b through the adhesive layer 11 when assembled. The first main surface 3s of the second flap 3h is attached to the second main surface 3t of the first surface 3a through the adhesive layer 11 when assembled. The first main surface 3s of the third flap 3k is attached to the second main surface 3t of the first surface 3a through the adhesive layer 11 when assembled.

The metal film 7 is formed on (or otherwise disposed on) the entire surface of the first main surface 3s of the base material 3 except for the slit 9. The metal film 7 can be made of a film body of a conductive material, such as an aluminum foil or a copper foil, and is formed by attaching a metal sheet, for example. By using a metal having a small resistance value such as aluminum or copper as the metal film 7, a communication distance can be increased. The thickness of the metal film 7 is, for example, more than 5 μm and 40 μm or less. The metal film 7 is physically divided into two or more regions by the slit 9. In the first embodiment, the metal film 7 is divided into two regions of a first metal region 7a and a second metal region 7b, and the first metal region 7a and the second metal region 7b are electrically insulated by the slit 9. It should be noted that the metal film 7 does not need to be formed on the entire surface of the base material 3, and may be partially formed on the first flap 3g and another surface, for example.

In operation, the metal film 7 functions as a dipole antenna by a first metal region 7a extending outward of the container 1 in a direction intersecting the slit 9 and a second metal region 7b extending outward of the container 1 in a direction opposite to the first metal region 7a in the direction intersecting the slit 9. When the container 1 is irradiated with the electromagnetic wave at the communication frequency, in the first flap 3g, resonance occurs with the communication frequency in a direction intersecting the slit 9, for example, a direction orthogonal to the slit 9, and a current Ir flows (see FIG. 1).

A distance Lg1 from the slit 9 to one end portion of the first flap 3g in a direction orthogonal to the slit 9 has the same length as a distance Lg2 from the slit 9 to the other end portion of the first flap 3g in a direction orthogonal to the slit 9. In addition, when the total length obtained by adding the distance Lg1, the distance Lg2, and the width W of the slit 9 is the length of the half wavelength of a high-frequency at the communication frequency, the communication distance is maximized. The length of the half wavelength of a high-frequency at the communication frequency may be, for example, a length in a direction orthogonal to the slit 9 from a place on the slit 9 to which the RFID module 5 is attached.

The slit 9 is a groove that divides the metal film 7 into a plurality of metal regions as described herein. The width W of the slit 9 is, for example, 0.5 mm to 3 mm. The slit 9 may be formed by shaving the metal film 7 after forming the metal film 7 on the entire first main surface 3s of the base material 3, or may be formed by attaching two metal sheets to the first main surface 3s of the base material 3 with a width of the slit 9 spaced apart. One end of the slit 9 extends to the end portion of the first flap 3g.

The RFID module 5 of the first embodiment is a wireless communication device configured to perform wireless communication (i.e., transmission and/or reception) using a high-frequency signal at a communication frequency (e.g., a carrier frequency). The RFID module 5 is configured to wirelessly communicate using a high-frequency signal at a frequency for communication in the UHF band, for example. In the exemplary aspect, the UHF band is a frequency band of 860 MHz to 960 MHz.

Figure 4:
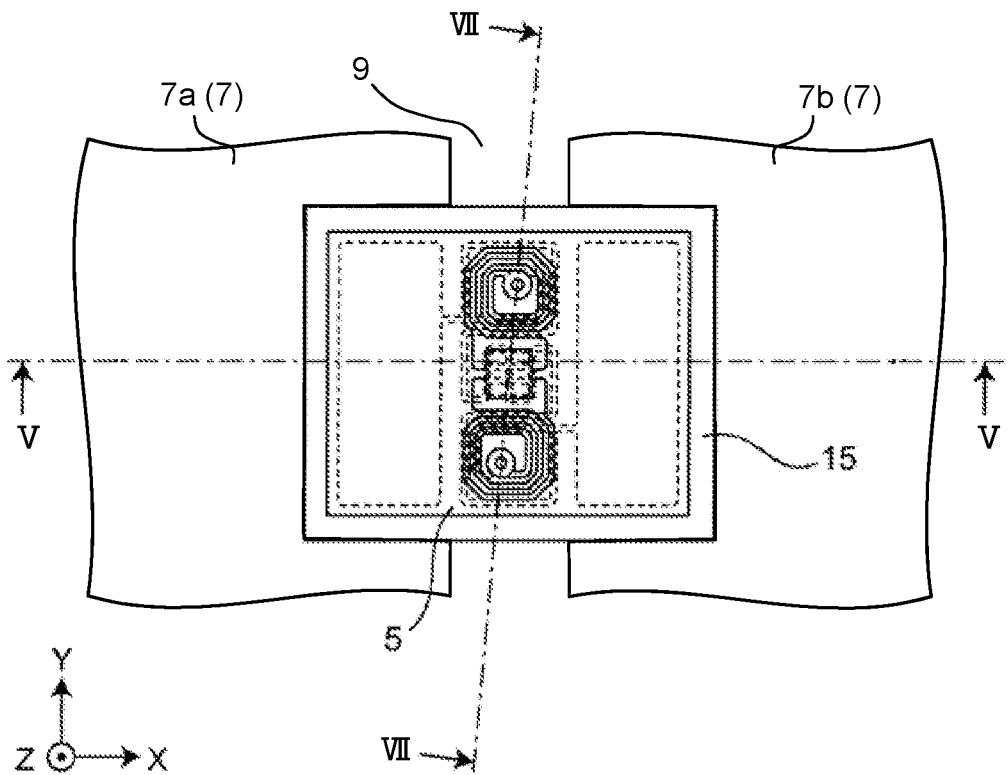
FIG. 4 is a perspective plan view of the RFID module.
Figure 5:
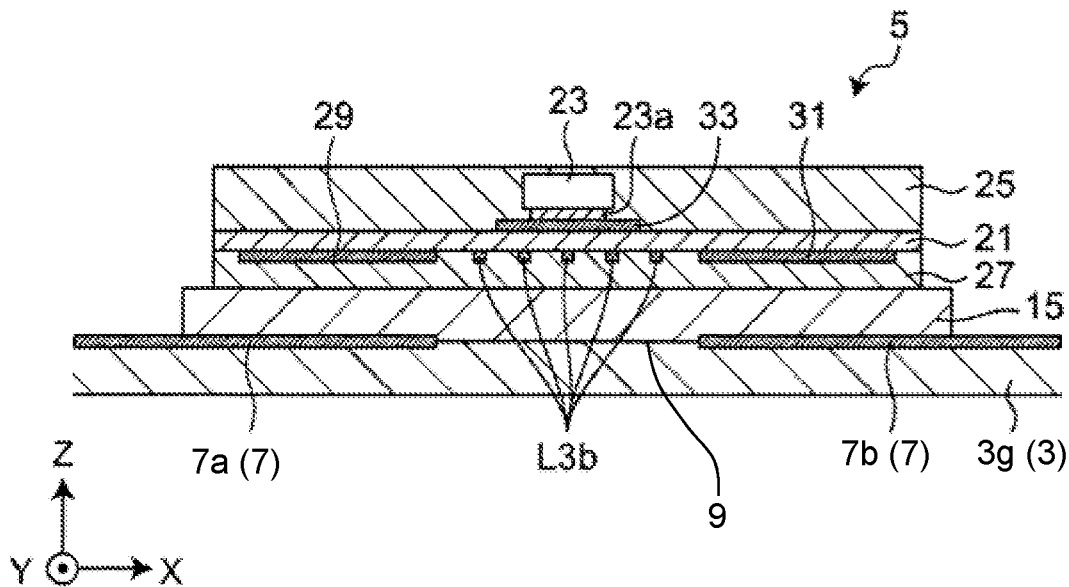
FIG. 5 is a cross-sectional view taken along line indicated by arrows V in FIG. 4.
Figure 6:
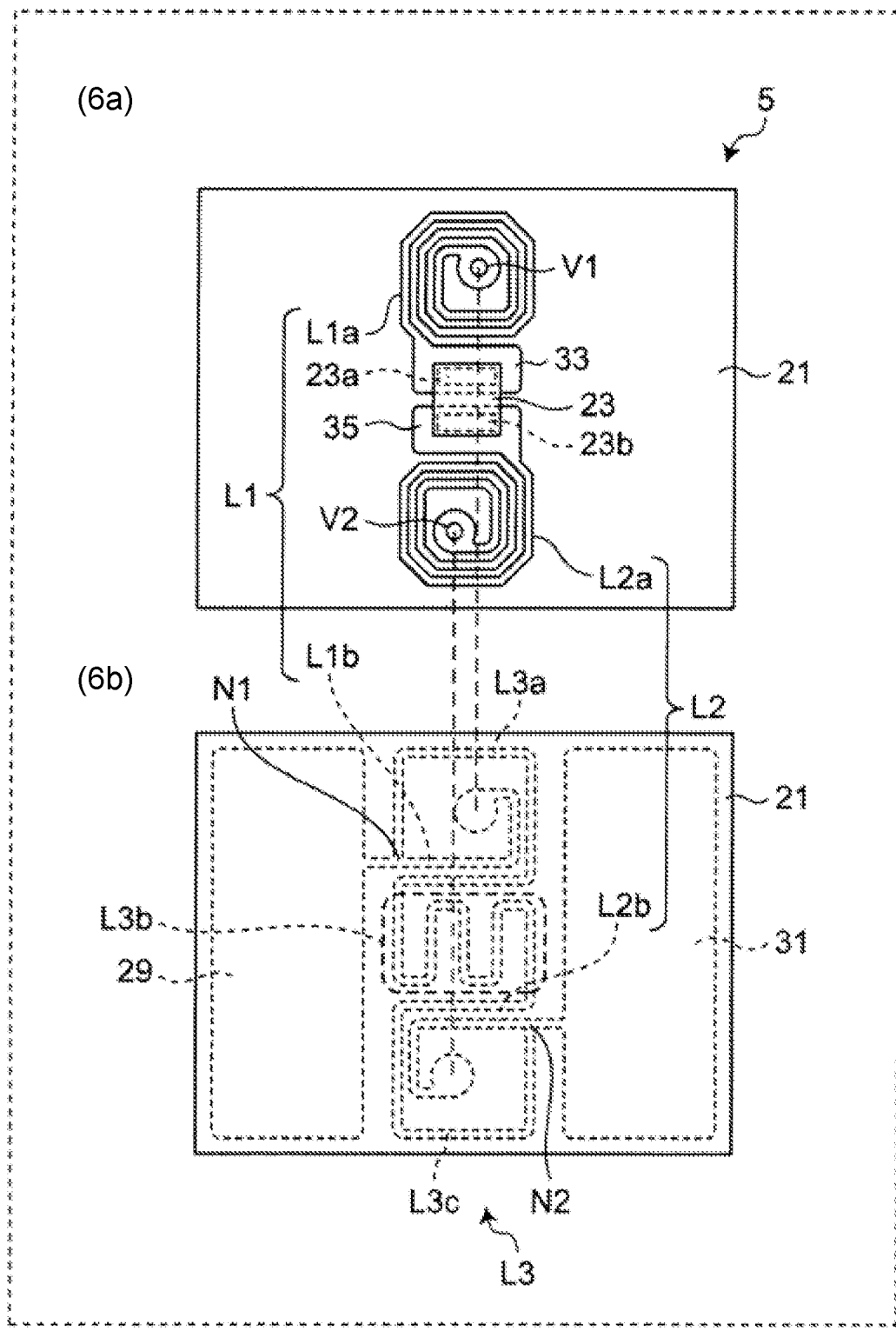
FIG. 6 shows a plan view of a conductor pattern on a substrate of the RFID module, with FIG. 6*a* being a plan view of a conductor pattern on an upper surface of the substrate of the RFID module, and FIG. 6*b* being a perspective plan view of a conductor pattern on a lower surface of the substrate as viewed from above.
Figure 7:
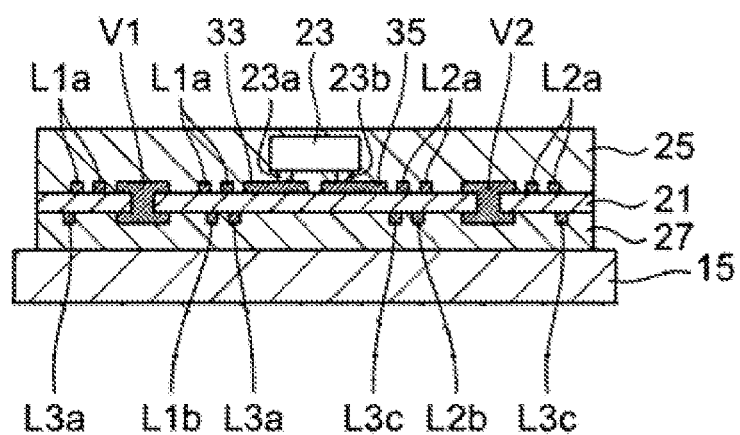
FIG. 7 is a cross-sectional view taken along line indicated by arrows VII in FIG. 4.

Next, a configuration of the RFID module 5 will be described with reference to FIGS. 4 to 7. FIG. 4 is a perspective plan view of the RFID module, and FIG. 5 is a cross-sectional view taken along line indicated by arrows V in FIG. 4. FIG. 6 shows a plan view of a conductor pattern formed on a substrate of the RFID module, FIG. 6a is a plan view of a conductor pattern formed on an upper surface of the substrate of the RFID module, and FIG. 6b is a perspective plan view of a conductor pattern formed on a lower surface of the substrate as viewed from above. FIG. 7 is a cross-sectional view taken along line indicated by arrows VII in FIG. 4. In the drawings, the X-Y-Z coordinate system facilitates understanding of the invention and does not limit the invention. The X-axis direction indicates a longitudinal direction of the RFID module 5, the Y-axis direction indicates a depth (width) direction, and the Z-axis direction indicates a thickness direction. The X, Y, and Z directions are orthogonal to one another.

As shown in FIG. 4, the RFID module 5 is bonded to the upper surface of each of the first metal region 7a and the second metal region 7b of the metal film 7 through an adhesive layer 11 such as a double-sided tape or a synthetic resin.

As shown in FIG. 5, the RFID module 5 includes a substrate 21 and an RFIC 23 mounted on the substrate 21. The substrate 21 is, for example, a flexible substrate such as polyimide. As further shown, a protective film 25 is formed on the upper surface of the substrate 21 on which the RFIC 23 is mounted. The protective film 25 is, for example, an elastomer such as polyurethane or a hot melt agent such as ethylene vinyl acetate (EVA). A protection film 27 is also attached to the lower surface of the substrate 21. The protection film 27 is, for example, a cover lay film such as a polyimide film (Kapton tape).

Referring to FIG. 6, on the upper surface of the substrate 21, a third electrode 33, a fourth electrode 35, a conductor pattern L1a of the main portion of a first inductance element L1, and a conductor pattern L2a of the main portion of the second inductance element L2 are formed. The third electrode 33 is connected to one end of the conductor pattern L1a, and the fourth electrode 35 is connected to one end of the conductor pattern L2a. During manufacture, these conductor patterns can be obtained by patterning a copper foil by photolithography, for example.

On the lower surface of the substrate 21, a first electrode 29 and a second electrode 31 respectively capacitively coupled to the first metal region 7a and the second metal region 7b of the metal film 7 are formed. In addition, on the lower surface of the substrate 21, a conductor patterns L1b of a part of the first inductance element L1, and conductor patterns L3a, L3b (i.e., conductor pattern surrounded by two-dot chain lines), and L3c of the third inductance element L3 are formed. These conductor patterns are also obtained by patterning a copper foil by photolithography, for example.

One end of the conductor pattern L1b of a part of the first inductance element L1 and one end of the conductor pattern L3a of the third inductance element L3 are connected to the first electrode 29. Similarly, one end of the conductor pattern L2*b* of the second inductance element L2 and one end of the conductor pattern L3*c* of the third inductance element L3 are connected to the second electrode 31. A conductor pattern L3*b* is connected between the other end of the conductor pattern L3*a* of the third inductance element L3 and the other end of the conductor pattern L3*c*.

The other end of the conductor pattern L1*b* of the first inductance element L1 and the other end of the conductor pattern L1*a* of the first inductance element L1 are connected through the via conductor V1. Similarly, the other end of the conductor pattern L2*b* of the second inductance element L2 and the other end of the conductor pattern L2*a* of the second inductance element L2 are connected through the via conductor V2.

The RFIC 23 is mounted on the third electrode 33 and the fourth electrode 35 formed on the upper surface of the substrate 21. That is, the terminal 23*a* of the RFIC 23 is connected to the third electrode 33, and the terminal 23*b* of the RFIC 23 is connected to the fourth electrode 35.

Moreover, the first inductance element L1 and the conductor pattern L3*a* of the third inductance element L3 are each formed in different layers of the substrate 21, and are arranged in a relationship in which the respective coil openings overlap each other. Similarly, the second inductance element L2 and the conductor pattern L3*c* of the third inductance element L3 are each formed in different layers of the substrate 21, and are arranged in a relationship in which the respective coil openings overlap each other. Furthermore, the RFIC 23 is positioned between the second inductance element L2 and the conductor pattern L3*c* of the third inductance element L3, and the first inductance element L1 and the conductor pattern L3*a* of the third inductance element L3 on the surface of the substrate 21.

In the RFID module 5, a first current path CP1 passing through the upper surface and the lower surface of the substrate 21 and a second current path CP2 passing through the lower surface of the substrate 21 are formed. The first current path CP1 reaches the second electrode 31 from the first electrode 29 through the branch point N1, the conductor pattern L1*b*, the conductor pattern L1*a*, the RFIC 23, the conductor pattern L2*a*, the conductor pattern L2*b*, and the branch point N2. The second current path CP2 reaches the second electrode 31 from the first electrode 29 through the branch point N1, the conductor pattern L3*a*, the conductor pattern L3*b*, the conductor pattern L3*c*, and the branch point N2. Here, the winding directions of the currents flowing through the first inductance element L1 including the conductor pattern L1b connected to the conductor pattern L1*a* through the via conductor V1 and the second inductance element L2 including the conductor pattern L2*b* connected to the conductor pattern L2*a* through the via conductor V2 are reverse to each other, and the magnetic field generated by the first inductance element L1 and the magnetic field generated by the second inductance element L2 cancel each other. The first current path CPT and the second current path CP2 are each formed in parallel with each other between the first electrode 29 and the second electrode 31.

Figure 8:
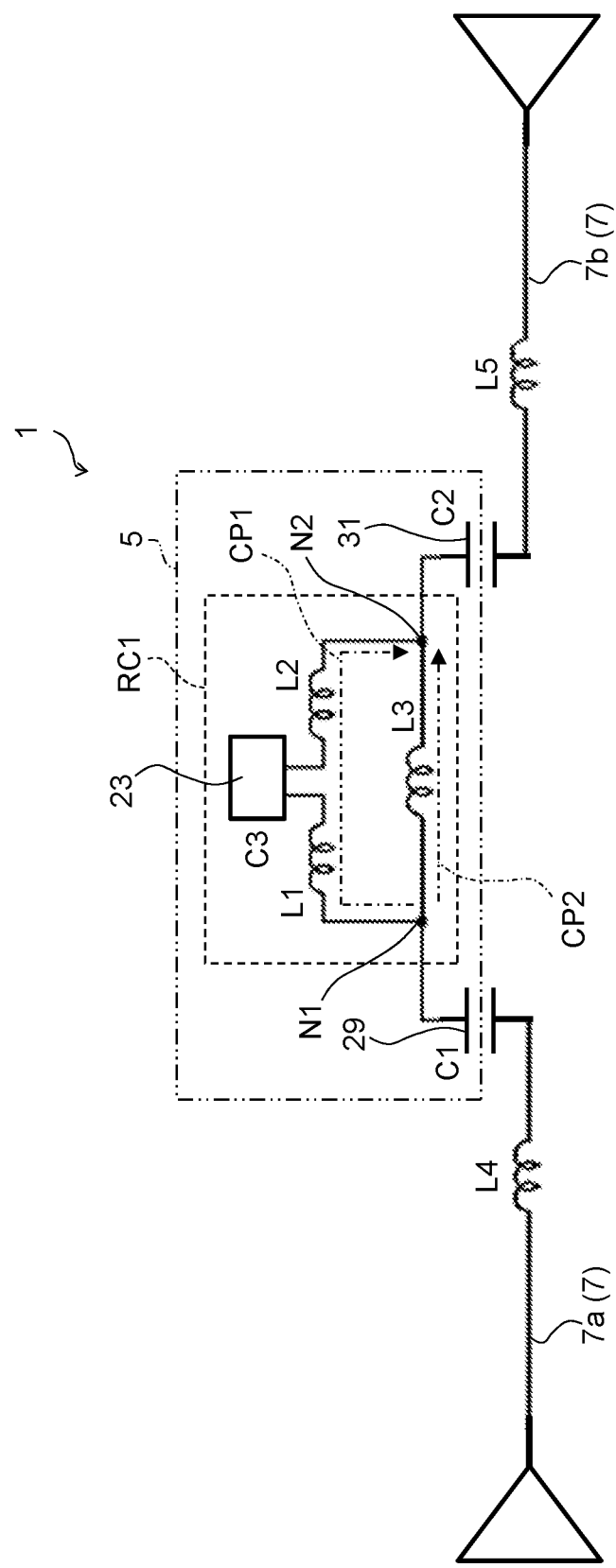
FIG. 8 is a circuit diagram of the RFID module.

Next, a circuit configuration of the RFID module 5 will be described with reference to FIG. 8, which is a circuit diagram of the RFID module 5.

In the RFID module 5, since the first current path CPT is a part of the parallel resonance circuit RC1 being the LC parallel resonance circuit and matches the radio wave at the communication frequency, when the metal film 7 receives the radio wave at the communication frequency, a current flows through the RFIC 23.

In the RFID module 5, a parallel resonance circuit RC1 is formed. The parallel resonance circuit RC1 is a loop circuit including the first inductance element L1, the RFIC 23, the second inductance element L2, and the third inductance element L3.

The capacitor C1 includes the first metal region 7*a*, the first electrode 29, the adhesive layer 11, and the protection film 27. The capacitor C2 includes the second metal region 7*b*, the second electrode 31, the adhesive layer 11, and the protection film 27. The fourth inductance element L4 is an inductance component of the first metal region 7*a* of the metal film 7, and the fifth inductance element L5 is an inductance component of the second metal region 7*b* of the metal film 7.

In operation, the parallel resonance circuit RC1 is configured to perform LC parallel resonance by impedance matching with respect to a radio wave at the communication frequency. Accordingly, matching with the RFIC is achieved at the communication frequency, and the communication distance of the RFID module 5 at the communication frequency can be secured.

Figure 9:
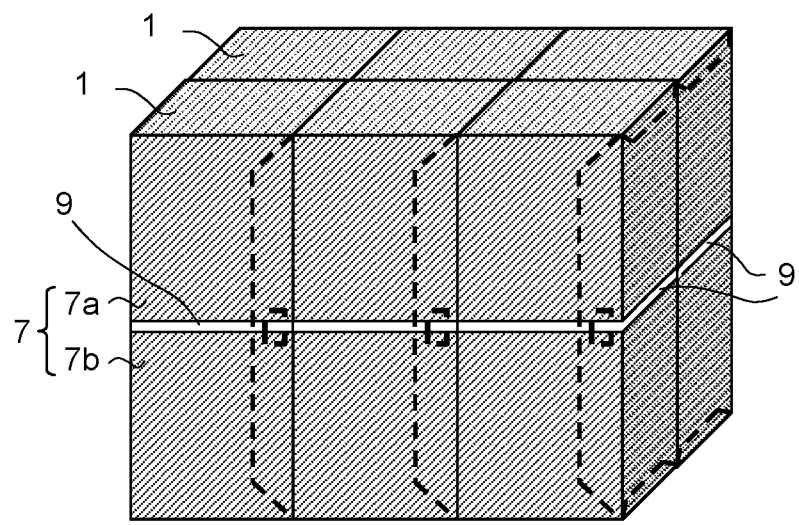
FIG. 9 is a perspective view in which the containers of the first exemplary embodiment are arranged in a superposed manner.

In the container 1 of the first embodiment, since the slits 9 are formed at the central portions in the longitudinal directions of the first surface 3*a*, the second surface 3*b*, the third surface 3*c*, and the fourth surface 3*d* each serving as a side surface, even when a plurality of containers 1 are arranged side by side as shown in FIG. 9, the slits 9 of the respective containers 1 overlap each other. Therefore, in the first metal region 7*a* and the second metal region 7*b* of the metal film 7 of each container 1, since the insulation state is maintained unless passing through the RFID module 5, communication with a plurality of containers 1 can be performed at a time.

Figure 10:
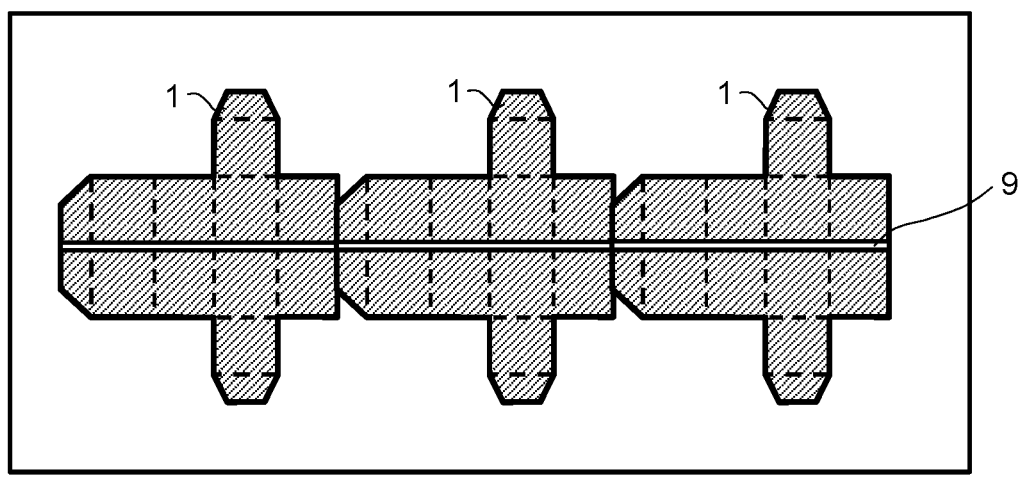
FIG. 10 is an explanatory view showing a manufacturing step of the container of the first exemplary embodiment.

In addition, in the container 1 of the first embodiment, as shown in FIG. 10, the metal film 7 can be formed on the front surface of the first main surface 3*s* of the unassembled developed container 1, and the slit 9 can be formed at a time for the plurality of unassembled containers 1.

As described above, the container 1 of the first embodiment includes: an insulating base material 3 (also referred to as a base); a metal film 7 on the first main surface 3*s* of the base material 3; a slit 9 that separates the metal film 7 into a first metal region 7*a* and a second metal region 7*b*; and an RFID module 5 that includes an RFIC 23, a parallel resonance circuit RC1 as a filter circuit configured to transmit a current due to an electromagnetic wave at a natural resonance frequency being a communication frequency to the RFIC 23, and first and second electrodes 29 and 31 connected to the parallel resonance circuit RC1. The first electrode 29 of the RFID module 5 and the first metal region 7*a* of the metal film 7 are electrically connected to each other. The second electrode 31 of the RFID module 5 and the second metal region 7*b* of the metal film 7 are electrically connected to each other.

Since the RFID module 5 is disposed across the slit 9 that divides the metal film 7 formed on the base material 3 of the container 1 into the first metal region 7*a* and the second metal region 7*b*, each of the first and second metal regions 7*a* and 7*b* can be used as an antenna electrode, and a current can flow through the RFIC 23 by series resonance. Therefore, even in the case of a container 1 on which the metal film 7 is formed, a container 1 can be provided having the RFID module 5 configured to perform wireless communication and to suppress reduction in designability.

In addition, the container 1 of the embodiment can be provided at a lower cost than a container to which a conventional metal-compatible RFID module is attached. In addition, when the conventional flag type RFID module protrudes from the container and is broken, communication characteristics deteriorate. Furthermore, since the RFID module has to protrude from the container, the degree of freedom of designability is reduced. However, if the container 1 of the embodiment is used, since the RFID module does not need to protrude from the container, the degree of freedom of designability is maintained.

In operation, when the metal film 7 is irradiated with the electromagnetic wave at the communication frequency, a current flows in a direction intersecting the slit 9. As described above, since the metal film 7 functions as a dipole antenna, communication characteristics as a dipole antenna can be obtained.

In addition, the length in the direction orthogonal to the slit 9 of the metal film 7 has an electrical length of ½ wavelength of the electromagnetic wave at the communication frequency. Accordingly, the maximum communication distance of the metal film 7 as a dipole antenna can be obtained.

Moreover, the slit 9 goes around the first surface 3a to the fourth surface 3d serving as the side surfaces of the container 1. Accordingly, even when a plurality of containers 1 are arranged in the same direction, the slits 9 are in contact with each other, and the first metal region 7a and the second metal region 7b of the metal film 7 of each container 1 do not conduct without going through the RFID module 5. According to this configuration, it is possible to communicate with the plurality of containers 1 at a time.

Moreover, the first metal region 7a and the second metal region 7b may be line-symmetric with respect to the slit 9. Accordingly, even when a plurality of containers 1 are arranged with the containers 1 turned upside down with respect to the slits 9, the slits 9 are in contact with each other, and the first metal region 7a and the second metal region 7b of the metal film 7 of each container 1 do not conduct without going through the RFID module 5. Therefore, the operator can reduce attention to the direction of the container 1.

According to an exemplary aspect, the base material 3 may include a first flap 3g continuous with the first surface 3a for connecting by an adhesive layer 11 the first surface 3a and the second surface 3b on each of which a metal film 7 is formed, the metal film 7 may also be formed on the first flap 3g, the slit 9 may also be formed on the first flap 3g, and the RFID module 5 may be disposed on the first flap 3g. Accordingly, in the container 1, the RFID module 5 arranged on the first flap 3g continuous with the first surface 3a is attached to the inner surface of the second surface 3b, and thus does not appear on the outer surface of the container 1. Therefore, the designability of the container 1 can be maintained.

The metal film 7 is formed on the entire surface of the first main surface 3s of the base material 3 except for the slit 9. As described above, a design in which a metal film 7 is formed on the entire surface of the first main surface 3s of the container 1 can also be achieved.

Figure 11:
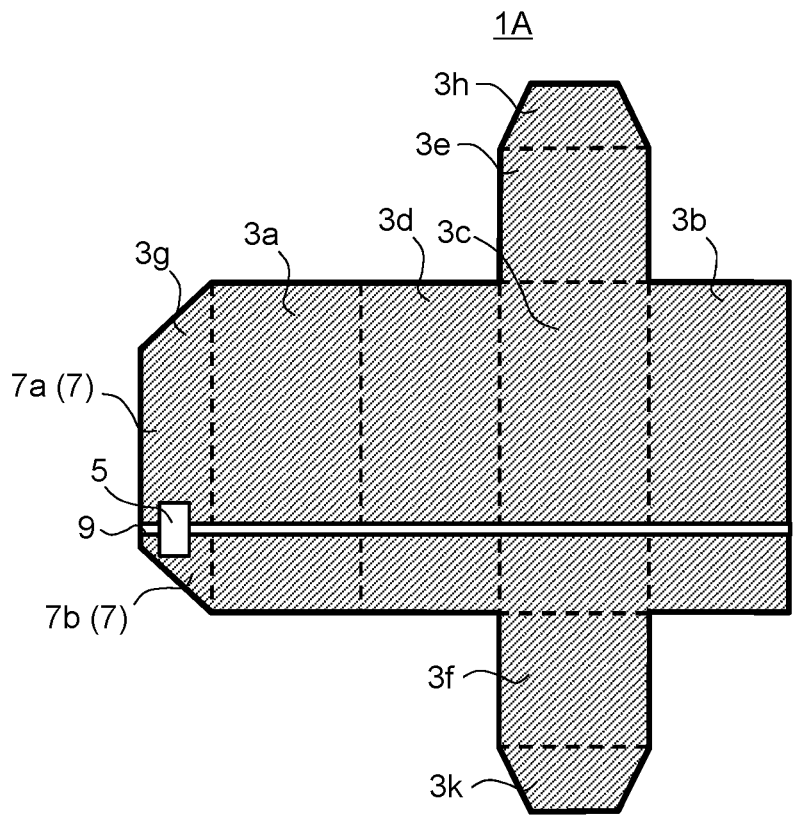
FIG. 11 is a developed view of a container in a modification of the first exemplary embodiment.

Next, a first modification of the first exemplary embodiment will be described with reference to FIG. 11. FIG. 11 is a developed view of a container TA in the first modification of the first embodiment. The container 1A in the first modification of the first embodiment has a configuration in which the slit 9 of the container 1 of the first embodiment is shifted downward. The other configurations are substantially the same as those of the container 1 of the first embodiment.

Figure 12:
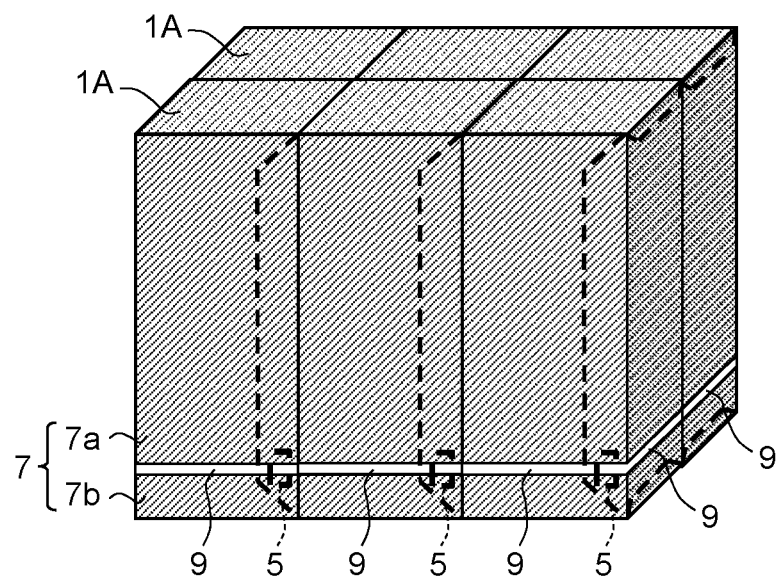
FIG. 12 is a perspective view in which containers of a modification of the first exemplary embodiment are arranged in a superposed manner.

Since the container 1A in the first modification has a short electrical length orthogonal to the slit 9 in the second metal region 7b, communication characteristics are lower than those of the container 1 of the first embodiment, but communication is possible. In addition, as shown in FIG. 12, even when a plurality of containers 1 are arranged in contact with each other, the first metal region 7a and the second metal region 7b are not brought into a conductive state without going through the RFID module 5 by aligning the directions so that the slits 9 are in contact with each other, and thus wireless communication can be collectively performed. In addition, by making a slit at a position where the content of the container 1A does not reach the slit 9, deterioration of the reading distance is reduced even when the content is metal or water.

Figure 13:
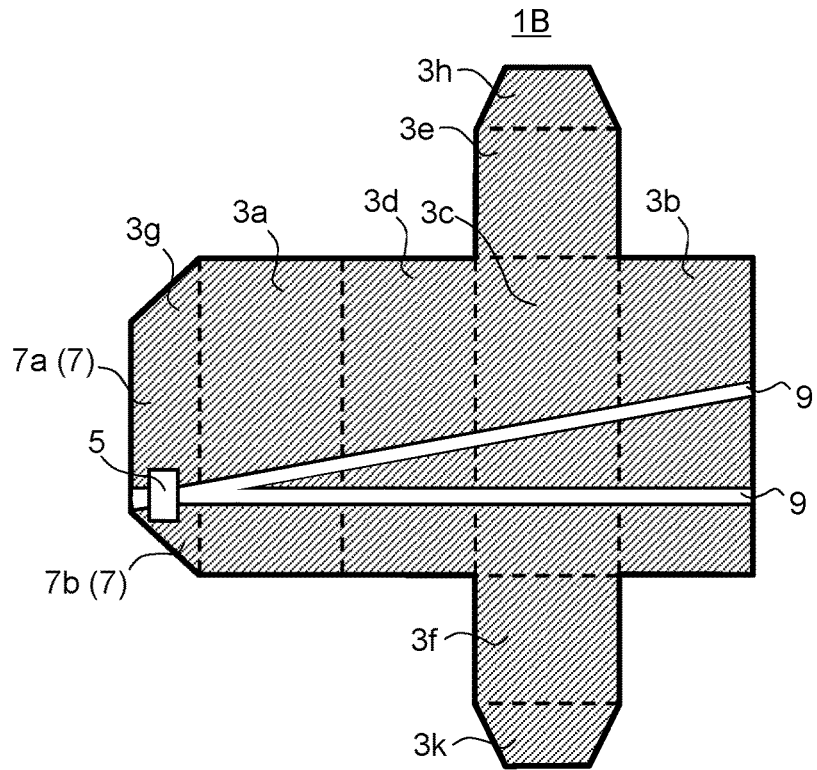
FIG. 13 is a developed view of a container in a modification of the first exemplary embodiment.

Next, a second modification of the first exemplary embodiment will be described with reference to FIG. 13. FIG. 13 is a developed view of a container 1B in the second modification of the first embodiment. The container 1B in the third modification of the first embodiment is configured to have two slits 9 in the container 1 of the first embodiment. The other configurations are substantially the same as those of the container 1 of the first embodiment. Since there is little influence on communication characteristics as long as the slits 9 are disposed below the RFID module 5, two or more slits 9 may be provided in the container 1B Therefore, the degree of freedom of designability of the container 1B by the slit 9 can be improved.

Figure 14:
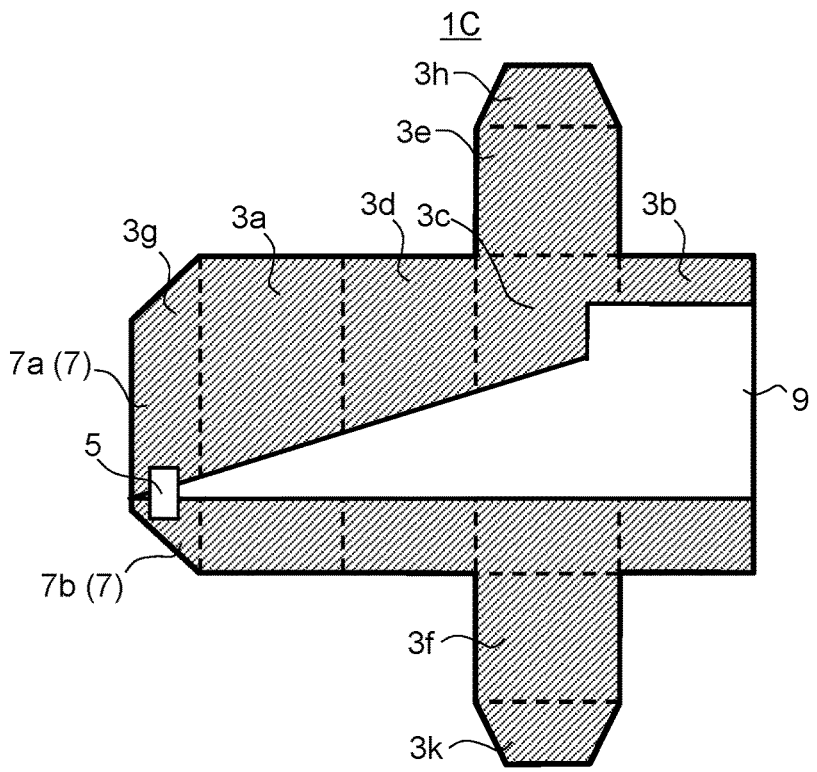
FIG. 14 is a developed view of a container in a modification of the first exemplary embodiment.

Next, a third modification of the first exemplary embodiment will be described with reference to FIG. 14. FIG. 14 is a developed view of a container 1C in the third modification of the first embodiment. The container 1C in the third modification of the first embodiment is configured so that the slit 9 does not have a linear shape but has a shape having a planar spread in the container 1A of the second embodiment. Even when the slit 9 of the container 1C has such a shape, the same effect as that of the container 1A of the first modification can be obtained.

Figure 15:
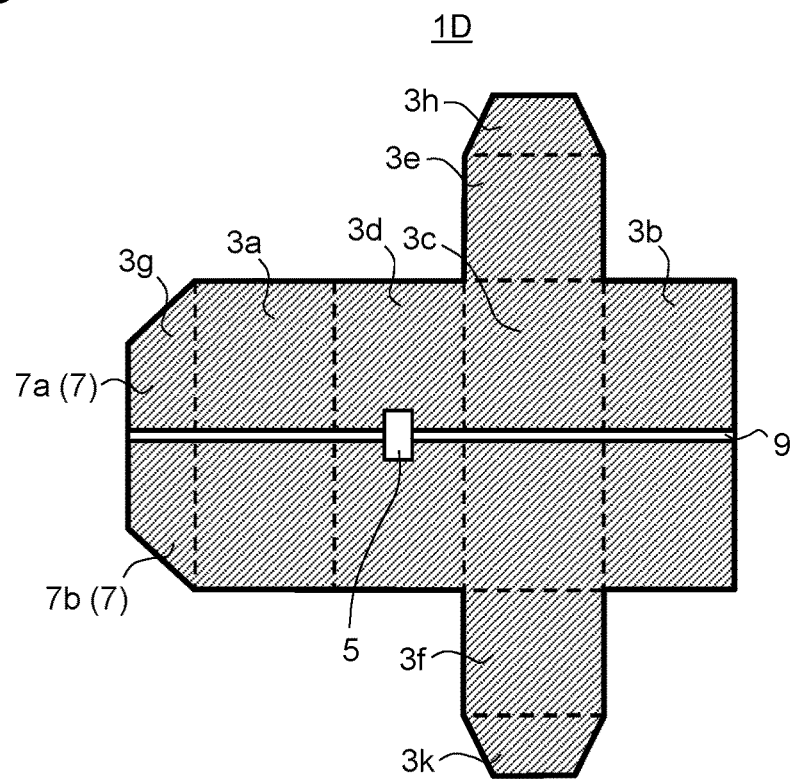
FIG. 15 is a developed view of a container in a modification of the first exemplary embodiment.

Next, a fourth modification of the first exemplary embodiment will be described with reference to FIG. 15. FIG. 15 is a developed view of a container 1D in the fourth modification of the first embodiment. The container 1D in the fourth modification of the first embodiment has a configuration in which the RFID module 5 is disposed not on the first flap 3g but on the fourth surface 3d in the container 1 of the first embodiment. When the RFID module 5 is arranged on the fourth surface 3d being one of the side surfaces as in the container 1D of the fourth modification, although the RFID module 5 appears on the outer surface of the container 1D, the communication characteristics do not change, so that the same effect as that of the container 1 of the first embodiment can be obtained.

Figure 16:
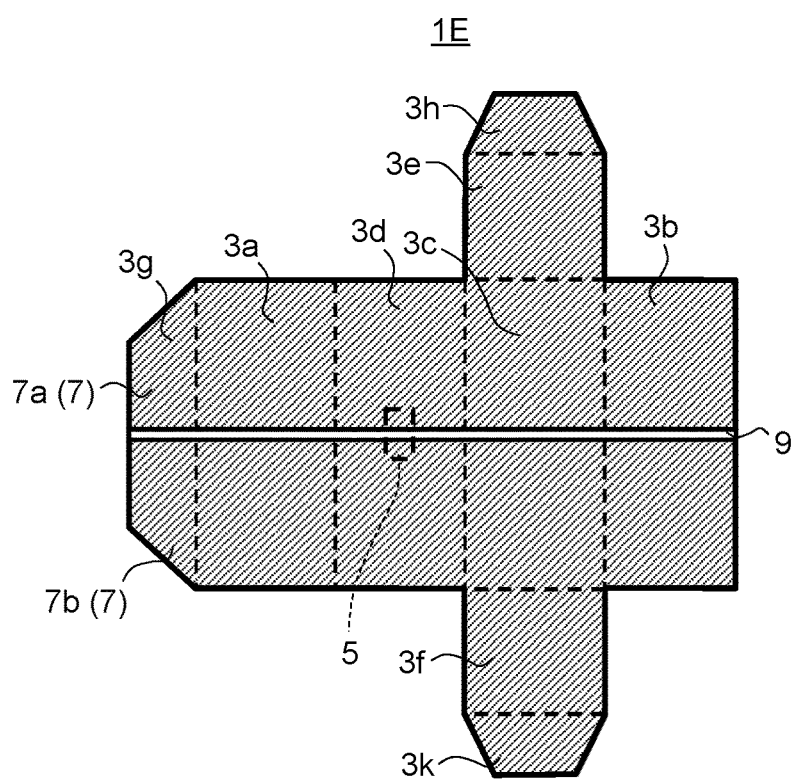
FIG. 16 is a developed view of a container in a modification of the first exemplary embodiment.

Next, a fifth modification of the first exemplary embodiment will be described with reference to FIG. 16. FIG. 16 is a developed view of a container 1E in the fifth modification of the first embodiment. The container 1D in the fifth modification of the first embodiment is configured so that the RFID module 5 is disposed on the second main surface 3t of the base material 3 in the container 1D of the fourth modification of the first embodiment. As described above, even when the RFID module 5 is disposed on the first surface 3a to the fourth surface 3d different from the first flap 3g, the RFID module 5 does not appear on the outer surface of the container 1, so that the design of the container 1 can be prevented from being reduced. In addition, the degree of freedom of arrangement of the RFID module 5 is improved.

Figure 17:
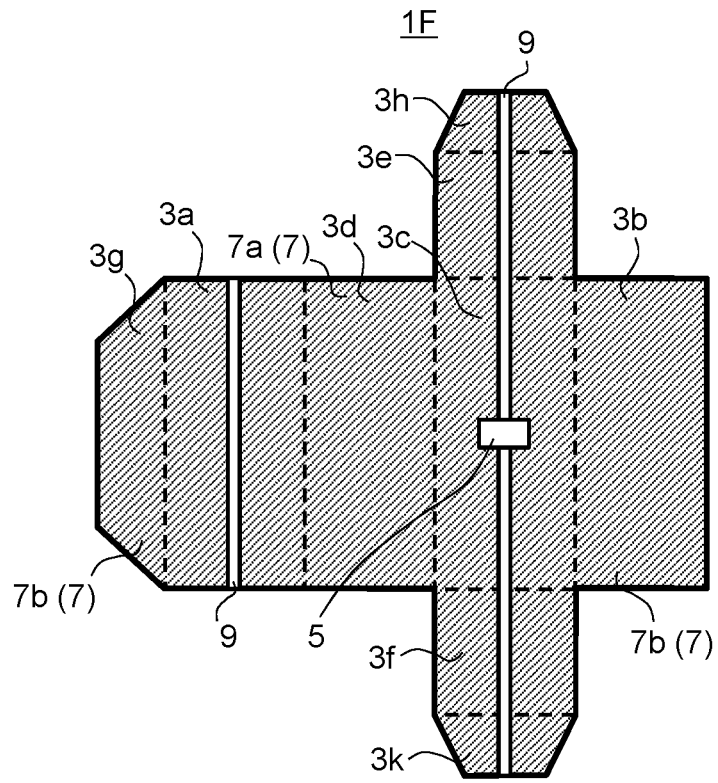
FIG. 17 is a developed view of a container in a modification of the first exemplary embodiment.

Next, a sixth modification of the first exemplary embodiment will be described with reference to FIG. 17. FIG. 17 is a developed view of a container 1F in the sixth modification of the first embodiment. The container 1F in the sixth modification of the first embodiment has a configuration in which the extending direction of the slit 9 goes around in the longitudinal direction of the container 1. The slit 9 of the sixth modification passes through the third surface 3c, the second flap 3h, and the third flap 3k. In addition, another slit 9a is formed in parallel with the slit 9 on the first surface 3a to which the second flap 3h and the third flap 3k are bonded. As described above, the metal film 7 is divided into the first metal region 7a and the second metal region 7b by the two slits 9 and 9a. It should be noted that when the first flap 3g is attached to the second surface 3b, the first flap 3g and the second surface 3b have the same potential due to capacitive coupling.

Figure 18:
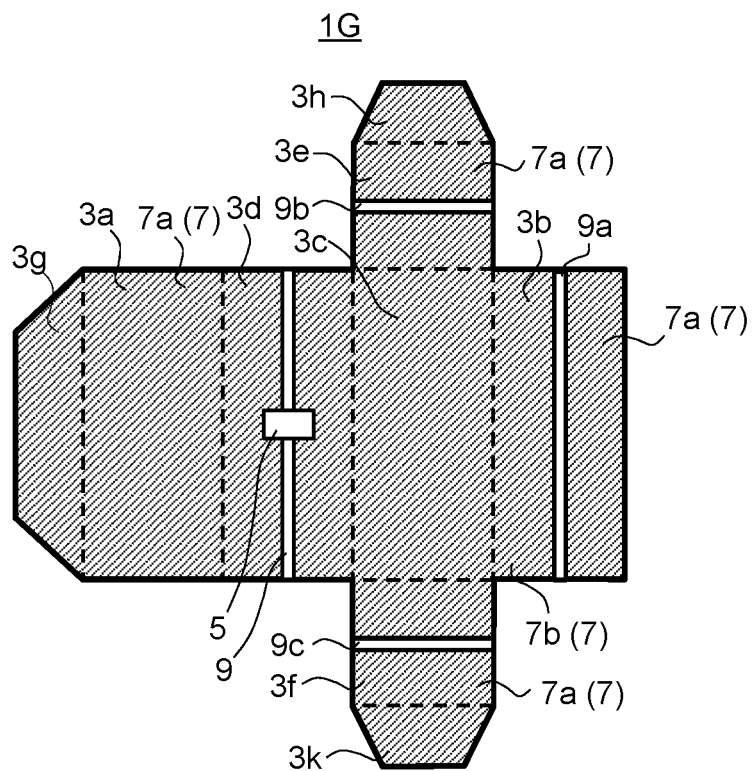
FIG. 18 is a developed view of a container in a modification of the first exemplary embodiment.

Next, a seventh modification of the first exemplary embodiment will be described with reference to FIG. 18. FIG. 18 is a developed view of a container 1G in the seventh modification of the first embodiment. The container 1G in the seventh modification of the first embodiment has a configuration in which the extending direction of the slit 9 goes around in the longitudinal direction of the container 1. The slit 9 of the seventh modification passes through the fourth surface 3d. In addition, another slit 9a is formed on the second surface 3b parallel to the fourth surface 3d when assembled. In addition, slits 9b and 9c are respectively formed on the fifth surface 3e and the sixth surface 3f so as to be positioned on the extension of the slit 9a on the second surface 3b and the slit 9 on the fourth surface 3d when assembled. As described above, the metal film 7 is divided into the first metal region 7a and the second metal region 7b by the four slits 9 and 9a to 9c.

Second Exemplary Embodiment

Hereinafter, a container 1 of a second exemplary embodiment of according to the present invention will be described.

A difference between the container 1 of the second embodiment and the container 1 of the first embodiment is a difference in sheet resistance of the metal film 7. Hereinafter, this difference will be mainly described. It should be noted that in the description of the second embodiment, the description of elements having the same configuration, action, and function as those of the above-described first embodiment may be omitted to avoid redundant description. In the container 1 of the second embodiment, a configuration other than the points described below is the same configuration as the RFID module 5 of the first embodiment.

The sheet resistance of the metal film 7 of the container 1 of the second embodiment is larger than the sheet resistance of the metal film 7 of the container 1 of the first embodiment. When the sheet resistance of the metal film 7 is large, the following problems that have not occurred in the container 1 of the first embodiment occur.

In the container 1 of the first embodiment, a resonance phenomenon occurs in the entire metal film 7 as an antenna electrode, and an electromagnetic wave is emitted. The thickness of the metal film 7 in the first embodiment is, for example, more than 5 µm and 40 µm or less, and the sheet resistance of the metal film 7 is 0.05Ω/□ or less.

The metal film of the container is usually formed for preventing food oxidation and improving designability, but even when the thickness of the metal film is, for example, a numerical value of one digit in units of µm such as 5 µm, when printing is made thereon by gravure printing or offset printing as a design, the printing thickness becomes about 1 µm. In this case, a step due to the thickness of the metal film as the antenna foil is generated in the printed matter, and this causes print misalignment (e.g., blurring or bleeding). For this reason, it has not been possible to directly print as a design on a container to which a conventional antenna foil is attached.

When a metal film as an antenna is formed by a vapor deposition method, the thickness of the metal film is further reduced to about 10 Å (=1 nm) to 10,000 Å (=1 µm). If the metal film has this degree of thickness, even when gravure printing is made on the metal film, print bleeding due to a step does not occur, but a metal film (deposited film) having this thickness, such as an aluminum foil, has a small film thickness, and thus has a large sheet resistance, for example, about 0.5Ω to 50 Ω/□.

When the sheet resistance of the metal film increases, even when a series resonance phenomenon in which a standing wave is generated in the entire antenna electrode by the metal film occurs, the radiation power becomes almost heat due to the resistance of the metal foil, so that electromagnetic wave radiation cannot be performed as an antenna.

In addition, since the resistance value of the matching circuit unit between the RFIC and the antenna also becomes the same thickness as the metal film, the resistance value of the matching circuit unit increases, the matching loss increases, and the RFID module does not operate.

As described above, the antenna electrode made of a thin metal film cannot generate electromagnetic wave radiation due to a (series) resonance phenomenon, but when the metal film receives an electromagnetic wave, a current flows through the metal film so as to cancel the electromagnetic wave, and the electromagnetic wave is shielded. This current is also referred to as eddy current. When the eddy current flows, the current component flowing through the metal film is not caused by the resonance phenomenon of the antenna electrode, and thus can support all frequency components regardless of the electrode pattern shape. This eddy current is known as an effect of metal shielding, but is not usually used as an antenna.

Since the RFID module 5 includes a parallel resonance circuit RC1 as a filter circuit that transmits only a current at a natural resonance frequency to the RFIC 23, an eddy current is selected in frequency, and a current flows through the RFIC 23 to transmit energy. Only a specific frequency is selected between the metal film 7 as an antenna electrode and the RFID module 5, impedance matching is performed, and energy transmission between the RFIC 23 and the metal film 7 is enabled. In this manner, it is considered that communication with the RFIC 23 is enabled.

Therefore, if the container 1 of the second embodiment is used, even when the sheet resistance of the metal film 7 is high, communication is enabled using an eddy current that has not been conventionally used.

Figure 19:
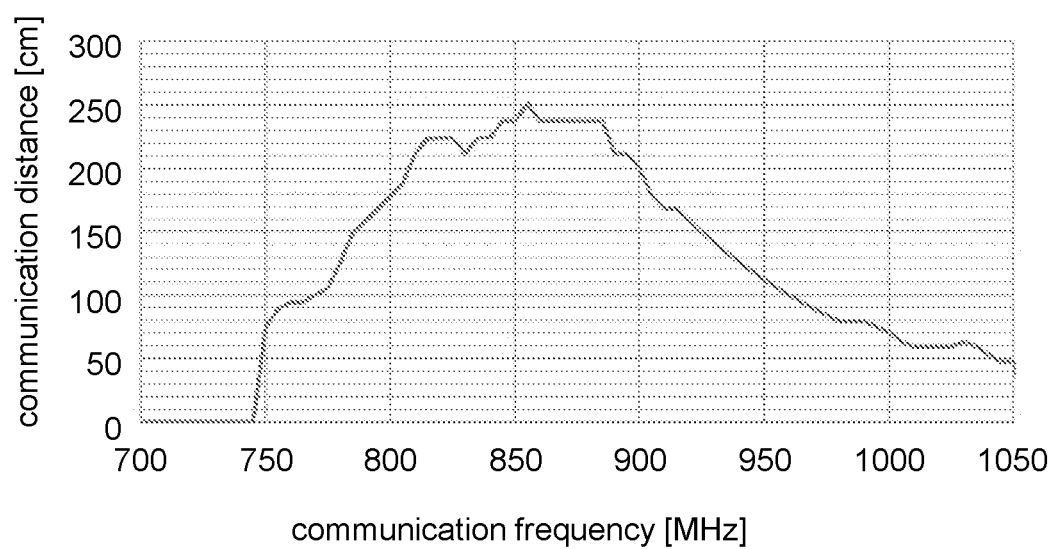
FIG. 19 is a graph showing communication characteristics of the RFID module of the second exemplary embodiment.

FIG. 19 is a graph showing communication characteristics of the container 1 including the RFID module 5 in the second embodiment. Even in the UHF band of 860 MHz to 960 MHz, the communication distance is about 100 cm or more, and particularly, the communication distance is 200 cm or more in the vicinity of 860 MHz.

In addition, the state in which the sheet resistance of the metal film 7 is high occurs not only by the thickness of the metal film 7, but also by the method for manufacturing the metal film 7. For example, also when the metal film 7 is formed of, for example, a conductive paste such as an Ag paste, the sheet resistance may be 0.5Ω or more. Even in this case, if the container 1 of the second embodiment is used, wireless communication can be performed.

It is noted that the exemplary aspects of the present invention are not limited to each of the embodiments described above, and can be modified and implemented as follows.

In each of the above-described embodiments, the container 1 is assembled, but the present invention is not limited thereto. The container 1 may be a bottle or a PET bottle in alternative aspects.

In each of the above embodiments, the communication frequency band is the UHF band, but the present invention is not limited thereto. Wireless communication may be performed with a high frequency signal having a communication frequency (e.g., a carrier frequency) in the HF band. In this case, the entire length of the metal film 7 orthogonal to the slit 9 is designed to receive a high-frequency signal in the HF band. It should be noted that the HF band is a frequency band of 13 MHz or more and 15 MHz or less.

Figure 20:
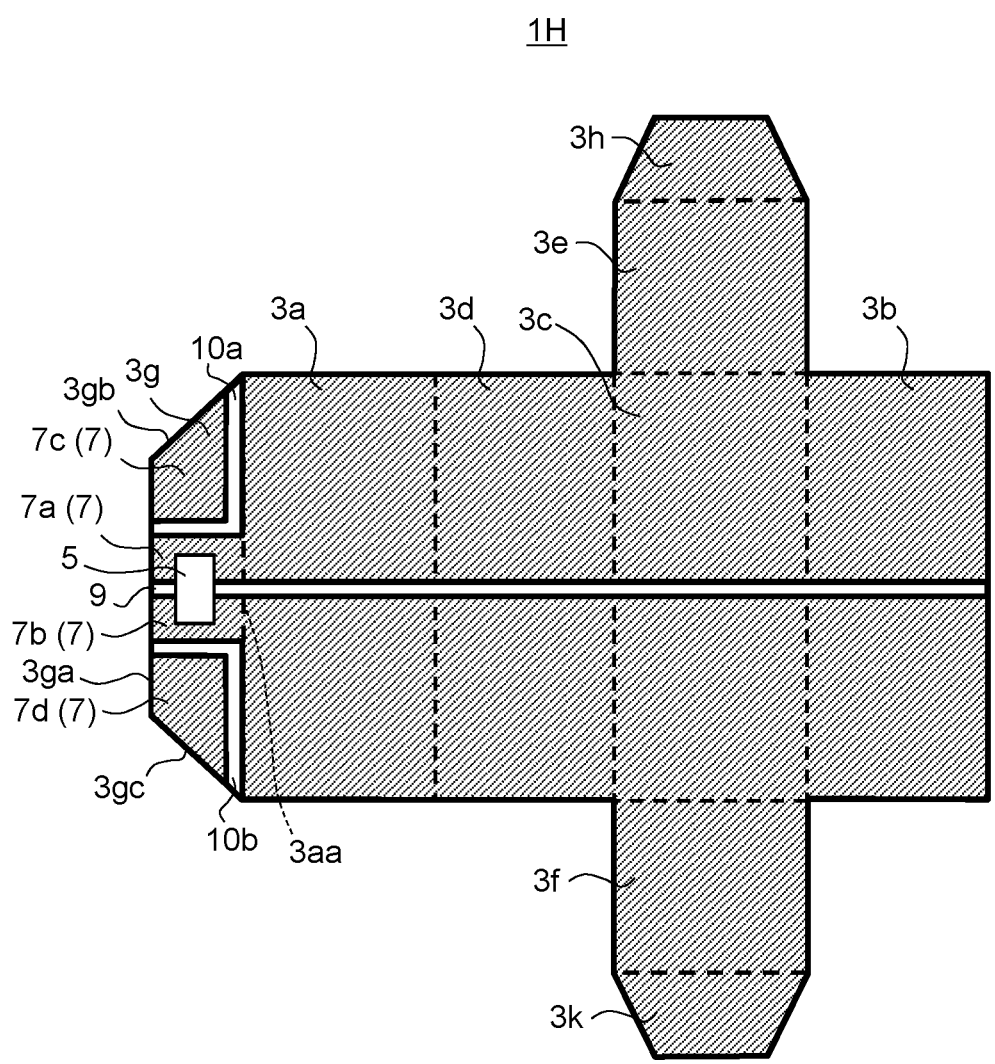
FIG. 20 is a developed view of a container in a modification of an exemplary aspect.

In each of the above embodiments, when the RFID module 5 is disposed in the first flap 3g, as shown in FIG. 20, another two first dividing slit 10a and second dividing slit 10b may be further formed in the metal film 7 of the first flap 3g, and the ratio of the first metal region 7a and the second metal region 7b with respect to the first flap 3g may be reduced. In a region on one side of the first flap 3g where the metal film 7 of the first flap 3g is divided by the slit 9, a first dividing slit 10a forming the first metal region 7a of the first flap 3g and the metal region 7c discontinuous with the first metal region 7a of the first surface 3a continuous with the first flap 3g is formed. In addition, in a region on the other side of the first flap 3g where the metal film 7 of the first flap 3g is divided by the slit 9, a second dividing slit 10b forming the second metal region 7b of the first flap 3g and the metal region 7d discontinuous with the second metal region 7b of the first surface 3a continuous with the first flap 3g is formed. The RFID module 5 and the slit 9 are positioned between the first dividing slit 10a and the second dividing slit 10b.

For example, in the first flap 3g, the first dividing slit 10a extends from the side edge 3ga at the tip of the first flap 3g toward the first surface 3a in parallel with the slit 9, bends outward at the boundary with the first surface 3a, and extends to the upper oblique side 3gb along the side 3aa between the first flap 3g and the first surface 3a. For example, in the first flap 3g, the second dividing slit 10b extends from the side edge 3ga at the tip of the first flap 3g toward the first surface 3a in parallel with the slit 9, bends outward at the boundary with the first surface 3a, and extends to the lower oblique side 3gc along the side 3aa between the first flap 3g and the first surface 3a. The first dividing slit 10a and the second dividing slit 10b are disposed in the first flap 3g, for example, line-symmetrically with respect to the slit 9. It should be noted that the first dividing slit 10a and the second dividing slit 10b are not limited to L-shaped, and may be curved or linear-shaped. In addition, the metal in the metal region of the discontinuous metal region 7c and the discontinuous metal region 7d may be eliminated.

When the thickness of the adhesive layer 11 has variation in a state where the first flap 3g is attached to the second surface 3b, the distance between the first flap 3g and the second surface 3b has variation, and the characteristics of capacitive coupling between the respective metal films 7 of the first flap 3g and the second surface 3b may have variation. Accordingly, the communication characteristics of the container 1H may also have variation. However, according to the container 1H, by providing the first dividing slit 10a and the second dividing slit 10b that reduce the areas of the first metal region 7a and the second metal region 7b in the first flap 3g, the variation in the characteristics of capacitive coupling between the respective metal films 7 of the first flap 3g and the second surface 3b can be reduced. As such, it is also possible to reduce the variation in the communication characteristics of the container 1H.

Figure 21:
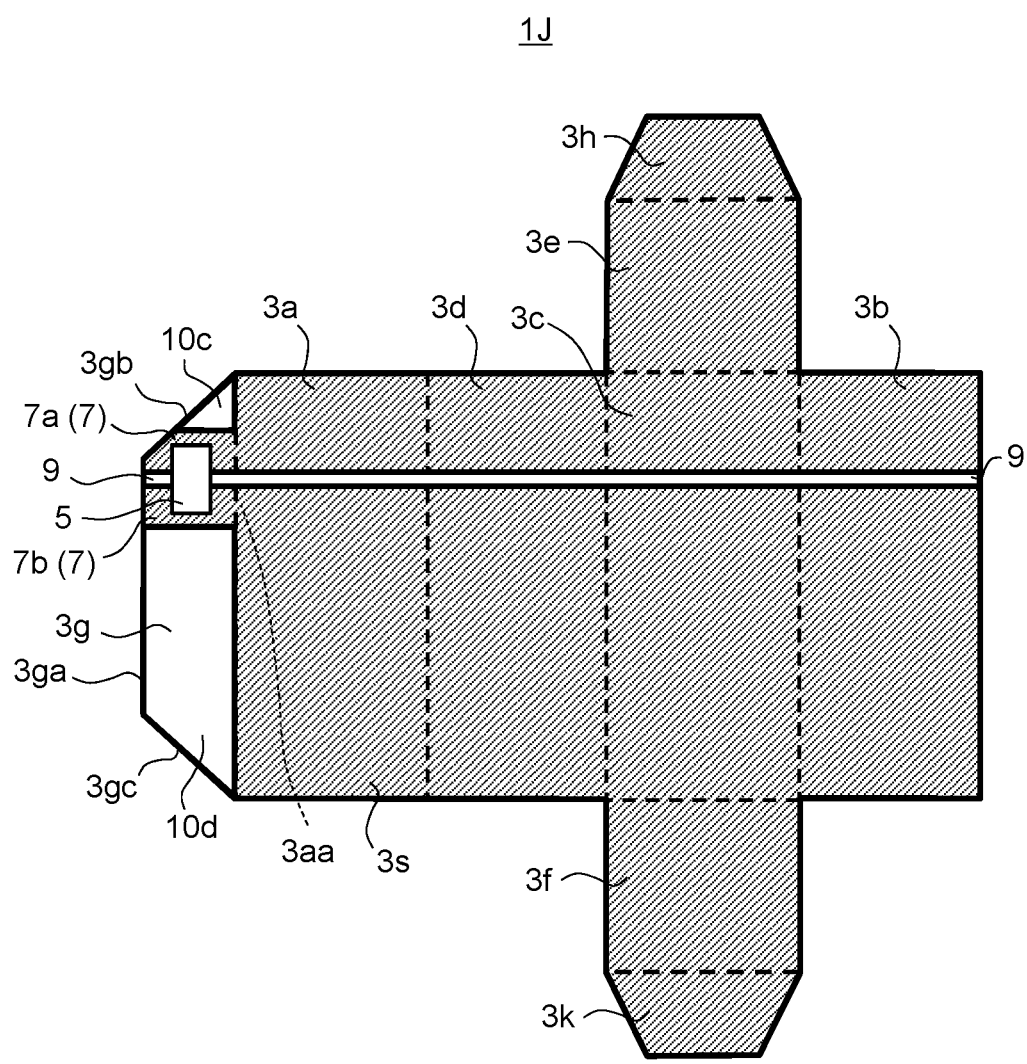
FIG. 21 is a developed view of a container in a modification of an exemplary aspect.

In each of the above embodiments, for example, as in a container 1J shown in FIG. 21, in the first flap 3g, a non-metallic region may exist on the respective first main surfaces 3s to be divided by the slit 9. FIG. 21 is a developed view of a container 1J in a modification of the exemplar aspect. In the first flap 3g, the first non-metallic region 10c is formed on the side farther from the slit 9 than the first metal region 7a, that is, on the upper oblique side 3gb side. In addition, the second non-metallic region 10d is formed on the side farther from the slit 9 than the second metal region 7b, that is, on the lower oblique side 3gc side.

In the first non-metallic region 10c and the second non-metallic region 10d, for example, the first main surface 3s of the base material 3 is exposed, and the adhesive layer 11 is formed on the first non-metallic region 10c and the second non-metallic region 10d, whereby the front surface (e.g., a first main surface 3s) of the base material 3 of the first flap 3g and the back surface (e.g., a second main surface 3t) of the base material 3 of the second surface 3b can be bonded without interposing the metal film 7. Accordingly, the adhesive force between the first flap 3g and the second surface 3b is improved.

In each of the above embodiments, the RFID module 5 is attached to the first metal region 7a and the second metal region 7b, but it is noted that the present invention is not limited thereto. The RFIC 23 may be electrically connected to the first metal region 7a and the second metal region 7b through an inductor. In this case, the inductor is formed on the antenna pattern side. When the inductor is formed on the antenna pattern side, the sheet resistance of the metal film 7 may be reduced by attaching a metal foil as in the first embodiment.

In each of the above embodiments, on the metal film 7, a coating material may be applied to a region other than a place to which the RFID module 5 is attached to form a pattern and to improve the designability of the container 1. In addition, the metal film 7 and the slit 9 may be formed on the second main surface 3t of the base material 3 instead of the first main surface 3s. That is, the metal film 7 and the slit 9 may be formed inside the container 1.

In general, it is noted that [0092] although the present invention is described with a certain degree of detail in each embodiment, the disclosure content of these embodiments should be changed in details of the configuration, changes in combination and order of elements in each embodiment can be achieved without departing from the scope and spirit of the claimed invention.

REFERENCE NUMERALS 1 container
3 base material
3a first surface
3aa side
3b second surface
3c third surface
3d fourth surface
3e fifth surface
3f sixth surface
3g first flap
3ga side edge 3gb upper oblique side
3gc lower oblique side
3h second flap
3k third flap
3s first main surface
3t second main surface
5 RFID module
5a front surface
5b back surface
7 metal film
7a first metal region
7b second metal region
9 slit
11 adhesive layer
15 adhesive
21 module substrate
23 RFIC
23a terminal
23b terminal
25 protective film
27 protection film
29 first electrode
31 second electrode
33 third electrode
35 fourth electrode
37, 39 conductor pattern
L1 first inductance element
L1a conductor pattern
L2a conductor pattern
L2 second inductance element
L2a conductor pattern
L2b conductor pattern
L3 third inductance element
L3a conductor pattern
L3b conductor pattern
L3c conductor pattern
L4 fourth inductance element
L5 fifth inductance element
Lg1 distance
Lg2 distance
CL center line
CP1 first current path
CP2 second current path
C1 capacitor
C2 capacitor

The invention claimed is:

1. A container including an RFID module, the container comprising:
a base having an insulating property and configured to form an outer shape of the container;
a metal film on a first main surface of the base; and
a slit that extends around a side surface of the container and that separates the metal film into a first metal region and a second metal region,
wherein the RFID module includes:
an RFIC element,
a filter circuit configured to transmit a current due to an electromagnetic wave at a natural resonance frequency being a communication frequency to the RFIC element,
a first electrode electrically connected to the first metal region of the metal film, and
a second electrode electrically connected to the second metal region of the metal film.

2. The container including the RFID module according to claim 1, wherein, when the metal film is irradiated with an electromagnetic wave at a communication frequency, a current flows in a direction that intersects the slit.

3. The container including the RFID module according to claim 2, wherein the metal film has a length in a direction orthogonal to the slit with an electrical length of a one-half wavelength of the electromagnetic wave at the communication frequency.

4. The container including the RFID module according to claim 1, wherein the first metal region and the second metal region are line-symmetric with respect to the slit.

5. The container including the RFID module according to claim 1,
wherein the container including the RFID module is an assembled box, and
wherein the base has a first surface and a second surface each having the first main surface to be side surfaces of the box, and a flap continuous with the first surface for connecting the first surface and the second surface by an adhesive layer.

6. The container including the RFID module according to claim 5, wherein:
the metal film and the RFID module are on the flap, and
the slit is in the flap.

7. The container including the RFID module according to claim 6, wherein one end of the slit extends to an end of the flap.

8. The container including the RFID module according to claim 6, further comprising:
a first dividing slit that forms the first metal region of the flap and a metal region discontinuous with the first metal region of the first surface in a region on one side of the flap where the metal film of the flap is divided by the slit, and
a second dividing slit that forms the second metal region of the flap and a metal region discontinuous with the second metal region of the first surface in a region on another side of the flap where the metal film of the flap is divided by the slit.

9. The container including the RFID module according to claim 1, wherein the RFID module is on a second main surface opposite to the first main surface of the base.

10. The container including the RFID module according to claim 1, wherein the metal film is on an entire surface of the first main surface of the base except for the slit.

11. The container including the RFID module according to claim 6,
wherein the flap includes a non-metallic region where the metal film is not on the first main surface of the flap, and
wherein the non-metallic region of the flap and a second main surface of the second surface are bonded to each other through the adhesive layer.

12. The container including the RFID module according to claim 1, wherein the filter circuit is an LC parallel resonance circuit.

13. The container including the RFID module according to claim 1, wherein the metal film has a sheet resistance that is 0.5Ω/□ or more.

14. The container including the RFID module according to claim 12, wherein the metal film has a thickness of 1 nm or more and 1 μm or less.

15. A container including an RFID module, the container comprising:
a base having an insulating property and configured to form an outer shape of the container; and
a metal film on a first main surface of the base and having a slit that extends around a side surface of the container and that separates the metal film into a first metal region and a second metal region, wherein the RFID module includes:

an RFIC element, a filter circuit is configured to transmit a current due to an electromagnetic wave at a natural resonance frequency that is a communication frequency to the RFIC element, a first electrode electrically connected to the first metal region of the metal film, and a second electrode electrically connected to the second metal region of the metal film.

16. The container including the RFID module according to claim 15, wherein the first metal region and the second metal region are line-symmetric with respect to the slit.

17. The container including the RFID module according to claim 15, wherein the container including the RFID module is an assembled box, and wherein the base has a first surface and a second surface each having the first main surface to be side surfaces of the box, and a flap continuous with the first surface for connecting the first surface and the second surface by an adhesive layer.

* * * * *